No. 814,806. PATENTED MAR. 13, 1906.
L. C. SANDS.
PIPE COUPLING.
APPLICATION FILED DEC. 31, 1904.
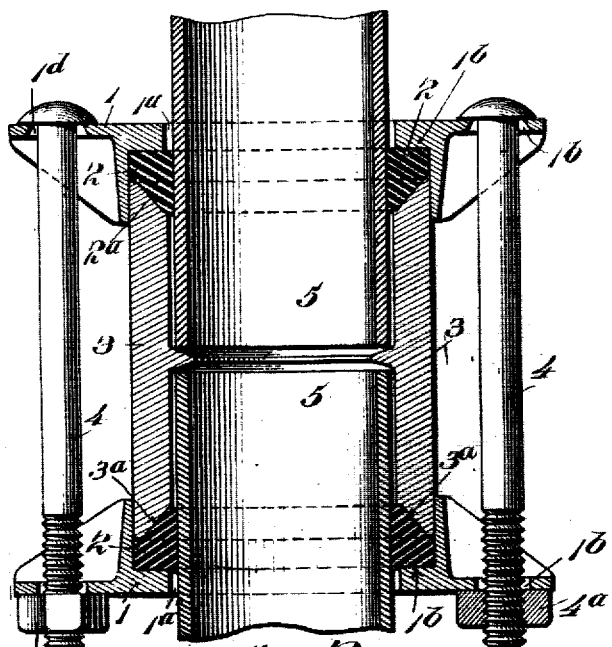
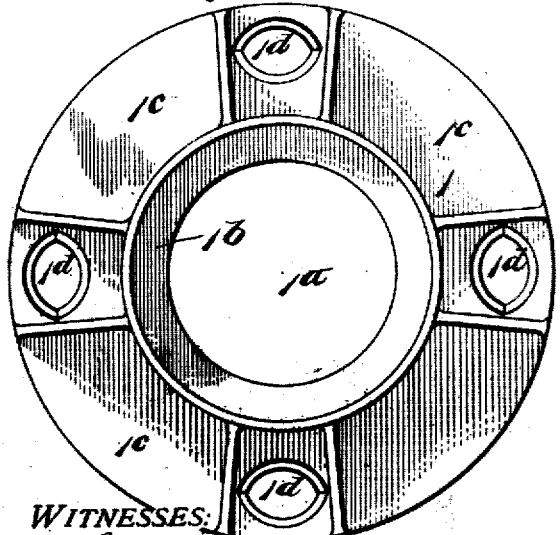
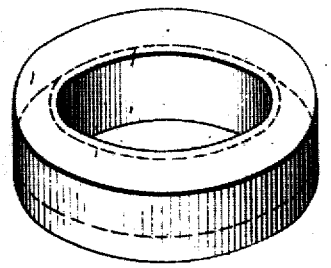
WITNESSES:
H. G. Dieterich
G. P. Ritter
INVENTOR
Louis C. Sands
BY F. W. Ritter, Jr.
Attorney

# UNITED STATES PATENT OFFICE.

LOUIS C. SANDS, OF PITTSBURG, PENNSYLVANIA, ASSIGNOR TO OIL WELL SUPPLY COMPANY, OF PITTSBURG, PENNSYLVANIA, A CORPORATION OF PENNSYLVANIA.

PIPE-COUPLING.

No. 814,806.  Specification of Letters Patent.  Patented March 13, 1906.

Application filed December 31, 1904. Serial No. 239,162.

*To all whom it may concern:*

Be it known that I, LOUIS C. SANDS, a citizen of the United States, residing at Pittsburg, in the county of Allegheny and State of Pennsylvania, have invented certain new and useful Improvements in Pipe-Couplings; and I hereby declare the following to be a full, clear, and exact description of the same, reference being had to the accompanying drawings, in which—

Figure 1 is a longitudinal central section of a pipe-coupling embodying my invention, shown in conjunction with the ends of two sections of pipe coupled or connected thereby. Fig. 2 is a plan view of one of the clamp members, showing the gasket-chamber or packing-chamber. Fig. 3 is a detached sectional view of the gasket or packing-ring. Fig. 4 is a view of the ordinary or rectangular cross-section packing-ring, the dotted lines indicating how the same may be cut or beveled for use in repairs when emergency requires and the beveled ring supplied with the coupling is not obtainable.

Like symbols refer to like parts wherever they occur.

My invention relates generally to pipe-couplings, but has been especially devised for efficiently packing the adjacent ends of pipe-sections constituting a pipe-line where expansion and contraction is to be provided for, and has for its object the simplification of the combining parts or elements and the facilitation of application and repair.

Heretofore in this class of couplings, which, broadly stated, comprise clamp-sections, gaskets or packings, and an interposed sleeve-section, either the gasket-chamber or the interposed sleeve has been so shaped as to force the packing toward the pipe-section, and in some instances both the gasket or packing chamber and the interposed sleeve-section have been so shaped, thus necessitating the use of a particular form of gasket or packing-ring not readily obtainable in case of emergency repairs. Furthermore, in those couplings in which a V-shaped groove in the packing-ring and a wedge end to the interposed compression ring or sleeve have been employed in conjunction with a tapering gasket-chamber only a minor portion of the packing-ring has been effectively utilized, the resulting coupling being frequently inefficient. To overcome these several objections, I combine in a pipe-coupling with suitable clamp-sections having gasket-chambers of rectangular cross-section interposed gaskets and a compression-sleeve, said gaskets and sleeve being correspondingly beveled at their engaging ends and the compression-sleeve having an annular shoulder to the inner side of the bevel thereon and adjacent to the pipe-sections, whereby the gasket or packing as a whole is forced toward and compressed between the included pipe and the including sleeve and a simple and efficient coupling is obtained, and such a construction embodies the main feature of my invention.

I will now proceed to describe my invention more fully, so that others skilled in the art to which it appertains may apply the same.

In the drawings, 1 1 indicate the clamp-sections; 2 2, the packing-rings; 3, the interposed sleeve-section, and 4 4ᵃ the bolts and nuts, respectively, by means of which or their equivalents the clamp-sections 1 1 are drawn together to compress the gaskets or packing-rings between the sleeve-section 3 and the ends of the pipes 5 5.

The clamp-sections 1 1 are each formed with a central aperture 1ᵃ of slightly greater diameter than the pipe 5 and surrounding said aperture with a gasket-chamber or packing-chamber 1ᵇ, the bottom and sides of which meet at substantially a right angle, so that when in position on the pipe the clamp-section forms therewith an annular gasket-chamber substantially rectangular in cross-section. Surrounding the gasket-chamber of the clamp-section is the flange 1ᶜ, having perforations or bolt-holes 1ᵈ.

The gaskets or packing-rings 2 2 are rings having the general cross-sectional form of a rectangle from which the outer edge has been cut or beveled off, as indicated at 2ᵃ, Fig. 3, and while such packing-rings having the inclined face or beveled outer edge will be especially provided for the coupling in case of an emergency they may be readily produced from the ordinary commercial packing-ring by beveling off the outer edge thereof, as indicated by the dotted lines, Fig. 4 of the drawings.

The interposed sleeve 3, which serves to force the gasket or packing-rings 2 2 toward the included pipe is for such purpose beveled on its interior at each end, as at $3^a$ $3^a$, so that the engaging portions of the gaskets or packing-rings 2 2 and sleeve 3 are correspondingly inclined, and said sleeve 3 is also provided at each end with an annular shoulder $3^b$ adjacent to the pipe 5, so that as the ends of the interposed sleeve 3 enter the gasket-chambers $1^b$ $1^b$ of the clamp-sections the gaskets as a whole or in their entirety are forced toward the pipe 5, thus preventing any tendency of the gasket to stretch or curl, as occurs when the gasket is provided with a V-shaped groove and the sleeve with a corresponding wedge end.

The several members of the coupling, being substantially such as hereinbefore pointed out, are assembled as indicated in Fig. 1 of the drawings—that is to say, the clamp-sections 1 1 are first strung upon the adjacent ends of the pipe-sections 5 5, the gaskets or packing-rings 2 2 are then applied to said pipes and seated in the gasket-chambers $1^b$, and the sleeve 3 is interposed between the gaskets or packing-rings 2 2, said sleeve including the pipe-sections 5 5 and having its ends entered in the gasket-chambers $1^b$, after which the bolts 4 and nuts $4^a$ or equivalent means are utilized to draw the clamp-sections 1 1 together and cause the annular inner shoulders $3^b$, as well as the beveled ends of the sleeve 3, to compress the gaskets or packing-rings 2 2 and force the rubber firmly into contact with the pipes 5 5 at all points.

Having thus described my invention, what I claim, and desire to secure by Letters Patent, is—

In a pipe-coupling, the combination of clamp-sections having gasket-chambers of rectangular cross-section, gaskets or packing-rings having the cross-sectional form of a rectangle from which the outer edge at one end has been removed to form a beveled or inclined face, and an interposed sleeve having its ends beveled or inclined to correspond with the inclined faces of the gaskets and provided with annular shoulders adjacent to the bevels thereon, substantially as and for the purposes specified.

In testimony whereof I affix my signature, in presence of two witnesses, this 30th day of December, 1904.

LOUIS C. SANDS.

Witnesses:
JOHN EATON,
EMMA H. GOODWIN.